United States Patent
Lewis et al.

(10) Patent No.: US 9,057,011 B2
(45) Date of Patent: Jun. 16, 2015

(54) ORGANOCLAY MATERIALS FOR ENVIRONMENTALLY SENSITIVE REGIONS

(75) Inventors: Samuel J. Lewis, Duncan, OK (US); Michael J. Szymanski, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 662 days.

(21) Appl. No.: 13/438,484

(22) Filed: Apr. 3, 2012

(65) Prior Publication Data

US 2012/0190594 A1 Jul. 26, 2012

Related U.S. Application Data

(62) Division of application No. 11/325,664, filed on Jan. 4, 2006.

(51) Int. Cl.
| | |
|---|---|
| *C09K 8/26* | (2006.01) |
| *C09K 8/16* | (2006.01) |
| *C01B 33/44* | (2006.01) |
| *C09K 8/36* | (2006.01) |

(52) U.S. Cl.
CPC . *C09K 8/26* (2013.01); *C01B 33/44* (2013.01); *C09K 8/36* (2013.01)

(58) Field of Classification Search
CPC ..... C09K 8/03–8/05; C09K 8/14; C09K 8/16; C09K 8/26; C09K 8/36
USPC ................... 507/100, 132, 200, 203; 106/632
See application file for complete search history.

(56) References Cited

U.S. PATENT DOCUMENTS

| | | | | |
|---|---|---|---|---|
| 3,514,399 | A * | 5/1970 | Robinson ..................... | 507/130 |
| 3,639,233 | A * | 2/1972 | Schultz et al. ................ | 507/126 |
| 4,566,977 | A * | 1/1986 | Hatfield ........................ | 507/114 |
| 4,575,428 | A * | 3/1986 | Clapper et al. ............... | 507/131 |
| 4,594,169 | A * | 6/1986 | Saito et al. .................... | 507/107 |
| 4,717,488 | A * | 1/1988 | Seheult et al. ................ | 507/211 |
| 5,333,698 | A * | 8/1994 | Van Slyke ...................... | 175/65 |
| 5,710,110 | A * | 1/1998 | Cooperman et al. .......... | 507/131 |

* cited by examiner

*Primary Examiner* — Pegah Parvini
(74) *Attorney, Agent, or Firm* — McDermott Will & Emery LLP; Craig W. Roddy

(57) ABSTRACT

Fluids comprising oil; and an organophilic clay comprising a smectite clay modified by reaction with a protonated amphoteric surfactant. The smectite clay may be montmorillonite, beidellite, nontronite, or a combination thereof. The protonated amphoteric surfactant may be cetyl/myristyl amine oxide, a stearyl amine oxide, a stearyl betaine, or a combination thereof. In some cases, the fluid may also include water and/or a solid reactive metal.

15 Claims, No Drawings

ORGANOCLAY MATERIALS FOR ENVIRONMENTALLY SENSITIVE REGIONS

CROSS-REFERENCE TO RELATED APPLICATIONS

This application is a divisional of U.S. patent application Ser. No. 11/325,664, filed on Jan. 4, 2006, entitled "Organophilic Clays and Methods for the Preparation Thereof," and published as US 2007/0155982.

The present invention is related to U.S. patent application Ser. No. 11/325,675, entitled "Organophilic Clays and Methods for the Preparation and Use Thereof," filed on the same date herewith, the entire disclosure of which is incorporated herein by reference.

BACKGROUND

The present invention relates to organophilic clays. More particularly, the present invention relates to organophilic clays that comprise a smectite clay modified by reaction with a protonated amphoteric surfactant, and methods for the preparation and use thereof.

Organophilic clays may be used in a wide variety of subterranean applications. As used herein, the term "organophilic clay" refers to a clay that is compatible with oils. In subterranean applications, organophilic clays are widely used, for example, in various cementing and sealing operations as well as to add viscosity and/or suspending power to various fluids. In addition to subterranean applications, organophilic clays also may be used in a variety of surface applications, for example, as a viscosifying agents, suspending agents, and the like.

In some instances, organophilic clays may comprise a smectite clay that has been modified by a cation exchange reaction with a fatty quaternary ammonium surfactant. Generally, the quaternary ammonium surfactant imparts some organophilic character to the clay. However, this class of chemicals has proved challenging from an environmental standpoint. For instance, the quaternary ammonium surfactants used heretofore may have undesirable environmental characteristics and/or may be limited by strict environmental regulations in certain areas of the world. As a result, use of these quaternary ammonium surfactants in subterranean applications may result in the potential for the bioaccumulation and/or persistence of the quaternary ammonium surfactants in the environment, which may create potential dangers for the use of the quaternary ammonium surfactants, such as adverse effects on shrimp and other aqueous aquatic species. Accordingly, in more environmentally sensitive regions, such as the North Sea, quaternary ammonium surfactants generally are not acceptable, and therefore the use of organophilic clays produced using quaternary surfactants is also not acceptable.

SUMMARY

The present invention relates to organophilic clays. More particularly, the present invention relates to organophilic clays that comprise a smectite clay modified by reaction with a protonated amphoteric surfactant, and methods for the preparation and use thereof.

In one embodiment, the present invention provides an organophilic clay comprising a smectite clay modified by reaction with a protonated amphoteric surfactant.

Another embodiment of the present invention provides a fluid comprising an oil and an organophilic clay comprising a smectite clay modified by reaction with a protonated amphoteric surfactant.

Another embodiment of the present invention provides a drilling fluid comprising an oil, water, and an organophilic clay comprising a smectite clay modified by reaction with a protonated amphoteric surfactant.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to organophilic clays. More particularly, the present invention relates to organophilic clays that comprise a smectite clay modified by reaction with a protonated amphoteric surfactant, and methods for the preparation and use thereof.

The organophilic clays of the present invention comprise a smectite clay modified by reaction with a protonated amphoteric surfactant. Among other things, the organophilic clays of the present invention may be used in subterranean and surface applications as viscosifying agents and/or suspending agents. For example, the organophilic clays of the present invention may be used as viscosifying agents in cementing, sealing, and/or drilling operations.

A wide variety of smectite clays may be used in the present invention. Generally, smectite clays contain exchangeable cations, such as sodium, potassium, calcium, barium, and the like. These exchangeable cations allow for reaction with the protonated amphoteric surfactant through a cation exchange reaction to form the organophilic clays of the present invention. Suitable smectite clays, include, but are not limited to, montmorillonite, beidellite, nontronite, and combinations thereof. Montmorillonite is commonly referred to as "bentonite."

The organophilic clays of the present invention further comprise a protonated amphoteric surfactant. The protonated amphoteric surfactants should adsorb onto the smectite clay through a cation exchange reaction to form the organophilic clays of the present invention. In some embodiments, the protonated amphoteric surfactant may be substituted for an amount in the range of from about 25% to about 100% of the exchangeable cations of the smectite clay. In some embodiments, the protonated amphoteric surfactant may be substituted for an amount in the range of from about 40% to about 70% of the exchangeable cations of the smectite clay. The degree of substitution depends on a number of factors such as the processing technique used to prepare the organophilic clay, the temperature of the processing technique, and the particular exchangeable cations of the smectite clay.

Suitable amphoteric surfactants include, but are not limited to, amine oxides, betaines, phosphobetaines, imidazolines, sultaines, and combinations thereof. Example of a suitable amine oxides are cetyl/myristyl amine oxide and stearyl amine oxide. An example of a suitable betaine is stearyl betaine. While the alkyl chain length of the amphoteric surfactants may vary, in some embodiments, the amphoteric surfactants may have an alkyl chain length in the range of from about 12 carbon atoms to about 24 carbon atoms. Those of ordinary skill in the art, with the benefit of this disclosure, will be able to select a suitable amphoteric surfactant and carbon chain length based on a number of factors, including, but not limited to, cost, environmental concerns, and the particular application.

The amphoteric surfactants may be protonated using any suitable processing technique. In some embodiments, the amphoteric surfactants may be protonated by lowering the pH thereof, for example, by mixing an amphoteric surfactant with an acid. The pH of the amphoteric surfactant should be lowered in an amount sufficient to provide the desired degree of protonation. In some embodiments, the amphoteric surfactant may be completely protonated. Where an acid is used to lower the pH of the amphoteric surfactant, the acid should have a pH below the pKa value of the surfactant. As used herein, the "pKa value" refers to the negative log of the ionization constant ("Ka"). Any of a variety of acids may be suitable to lower the pH of the amphoteric surfactant, including, but not limited to organic and mineral acids. For example, hydrochloric acid and acetic acid may be suitable.

The organophilic clays of the present invention may be prepared using any suitable processing technique. Generally, preparation of an organophilic clay of the present invention comprises reacting a smectite clay and a protonated amphoteric surfactant. In one embodiment, reacting the smectite clay and the protonated amphoteric surfactant comprises applying a protonated amphoteric surfactant to a dry smectite clay, for example, during extrusion or grinding of the dry smectite clay. In another embodiment, reacting the smectite clay and the protonated amphoteric surfactant comprises mixing a protonated amphoteric surfactant with a mixture of water and a smectite clay. The water included in this mixture may be freshwater, saltwater (e.g., water containing one or more salts dissolved therein), brine (e.g., saturated saltwater produced from subterranean formations), or seawater, or combinations thereof. Flocculation and filtration in water are two indicators of organophilic modification. For example, flocculation of the smectite clay out of the water after mixture therewith indicates organophilic modification. Filtration may provide a physical indication of organophilic modifications in that organophilic clays are hydrophobic so should agglomerate allowing the filtration off of the water, whereas an unmodified clay will not agglomerate and should plug the filter.

As previously discussed the organophilic clays of the present invention may be suitable for use in a variety of subterranean and surface applications. In some embodiments, the organophilic clays may be included in a fluid that comprises an oil and an organophilic clay of the present invention that comprises a smectite clay modified by reaction with a protonated amphoteric surfactant. Among other things, the organophilic clay may be included in the fluid as a viscosifying agent and/or a suspending agent. In some embodiments, the fluid may be an oil suspension that further comprises a solid additive suspended in the oil. In some embodiments, the fluid may be an emulsion (e.g., oil-in-water or water-in-oil), wherein the organophilic clay is present in the oil phase of the emulsion and/or at the interface of the oil and water phase. In some embodiments, the organophilic clay may act to stabilize the emulsion. In some embodiments, the fluid may be an invert emulsion drilling fluid. In some embodiments, the fluid may be a subterranean treatment fluid, such as a drilling fluid.

Suitable oils that may be included in the fluids of the present invention, include, but are not limited to, diesel oils, paraffinic oils, olefinic oils, mineral oils, vegetable oils, long chain esters, and combinations thereof. Where used, for example, in an emulsion, the water that may be included in the fluids of the present invention may include freshwater, saltwater (e.g., water containing one or more salts dissolved therein), brine (e.g., saturated saltwater produced from subterranean formations), or seawater, or combinations thereof.

Additionally, in some embodiments, the fluids of the present invention further may comprise a solid additive suspended in the oil. Examples of suitable solid additives include, but are not limited to, polymers, reactive metals, and combinations thereof. Inclusion of these solid additives in these oil suspensions, among other things, may facilitate the transport of the solid additive and/or mixing of the solid additive with water. In some embodiments, the oil suspensions further may be combined with water and then introduced into a well bore that penetrates a subterranean formation. The water that may be combined with the oil suspension may include freshwater, saltwater (e.g., water containing one or more salts dissolved therein), brine (e.g., saturated saltwater produced from subterranean formations), or seawater, or combinations thereof.

Depending on the particular application, additional additives may be included in the fluids of the present invention as desired by one of ordinary skill in the art. Suitable additives include, but are not limited to, dispersants, emulsifiers, salts, weighting agents, defoamers, and a variety of other suitable additives. For example, mono-, di-, and/or trivalent salts may be included in the fluids of the present invention, for example, to mitigate the swelling of formation clays.

An example method of the present invention comprises providing a fluid comprising an organophilic clay, the organophilic clay comprising a smectite clay modified by reaction with a protonated amphoteric surfactant; and introducing the fluid into a well bore that penetrates a subterranean formation. In some embodiments, the methods of the present invention further may comprise combining the fluid with water prior to the step of introducing the fluid into a well bore, for example, where the fluid is an oil suspension that further comprises a solid additive suspended in the oil.

Another example method of the present invention is a method of drilling a well bore, the method comprising providing a drilling fluid comprising an oil and an organophilic clay, the organophilic clay comprising a smectite clay modified by reaction with a protonated amphoteric surfactant; introducing the drilling fluid into the well bore; and drilling the well bore. Any suitable technique for drilling the well bore may be used in accordance with the methods of the present invention. As previously mentioned, in some embodiments, the drilling fluid may be an emulsion that comprising an oil phase and a water phase, wherein the organophilic clay is present in the oil phase. In some embodiments, the drilling fluid may be an invert emulsion.

To facilitate a better understanding of the present invention, the following example(s) of certain aspects of some embodiments are given. In no way should the following example(s) be read to limit, or define, the scope of the invention.

EXAMPLE

An organophilic clay was prepared using the following procedure. First, a cetyl/myristyl amine oxide having a yellow rating for Norway as of 2005 was treated with hydrochloric acid to reduce the pH to about 3, at which point the cetyl/myristyl amine oxide was protonated. Additionally, water and bentonite clay in an amount of 5% by weight of the mixture was placed in a Waring® blender and sheared for about 15 minutes to ensure substantially full hydration of the clay. Then, the protonated cetyl/myristyl amine oxide was added slowly to this mixture, and the slurry gained viscosity rapidly. The addition of the protonated cetyl/myristyl amine oxide surfactant was stopped when the viscosity of the slurry decreased and became low due to flocculation of the clay out of the water, indicating organophilic modification. Thereafter, the flocculated clay was filtered and dried in a vacuum oven overnight, after which the filtered and dried organophilic clay was ground into a powder.

Once prepared, the powder ground from the filtered and dried clay was added to a 70/30 mixture of a long chain mineral oil (ESCAID™ 110 oil from Exxon, Houston, Tex.) and water, and stirred for about 30 minutes. The result was an almost completely homogeneous thickening of the mixture by the clay. The mixture had only a slight amount of top oil and an emulsion stability reading of about 120 volts after standing for about 2 hours and showed no significant signs of settling overnight. The emulsion stability was determined using a FANN® ES Tester, from Fann Instrument Company, Houston, Tex.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee. Therefore, the present invention is well adapted to attain the ends and advantages mentioned as well as those that are inherent therein. While numerous changes may be made by those skilled in the art, such changes are encompassed within the spirit of this present invention as defined by the appended claims.

What is claimed is:

1. A fluid comprising
    an oil; and
    an organophilic clay comprising a protonated amphoteric surfactant modified smectite clay, and
        the protonated amphoteric surfactant is substituted for an amount in the range of from about 25% to about 100% of the exchangeable cations, and,
        the protonated amphoteric surfactant comprises a phosphobetaine, an imidazoline, a cetyl/myristyl amine oxide, a stearyl amine oxide, a stearyl betaine, and combinations thereof.

2. The fluid of claim 1 wherein the fluid is an emulsion.

3. The fluid of claim 1 wherein the oil is selected from the group consisting of a diesel oil, a paraffinic oil, an olefinic oil, a mineral oil, a vegetable oil, a long chain ester, and combinations thereof.

4. The fluid of claim 1 wherein the smectite clay is selected from the group consisting of montmorillonite, beidellite, nontronite, and combinations thereof.

5. The fluid of claim 1 wherein the protonated amphoteric surfactant has an alkyl chain length of from about 12 carbon atoms to about 24 carbon atoms.

6. The fluid of claim 1 wherein the smectite clay comprises montmorillonite and the protonated amphoteric surfactant comprises an amine oxide.

7. The fluid of claim 1 wherein the fluid further comprises a solid additive suspended in the oil, the solid additive selected from the group consisting of a polymer, a reactive metal, and combinations thereof.

8. A fluid comprising
    an oil;
    water; and
    an organophilic clay comprising a protonated amphoteric surfactant modified smectite clay, and
        the protonated amphoteric surfactant is substituted for an amount in the range of from about 25% to about 100% of the exchangeable cations,
        the protonated amphoteric surfactant comprises a phosphobetaine, an imidazoline, a cetyl/myristyl amine oxide, a stearyl amine oxide, a stearyl betaine, and combinations thereof
    wherein the fluid is suitable for use as a drilling fluid.

9. The fluid of claim 8 wherein the fluid is an invert emulsion.

10. The fluid of claim 8 wherein the oil is selected from the group consisting of a diesel oil, a paraffinic oil, an olefinic oil, a mineral oil, a vegetable oil, a long chain ester, and combinations thereof.

11. The fluid of claim 8 wherein the smectite clay is selected from the group consisting of montmorillonite, beidellite, nontronite, and combinations thereof.

12. The fluid of claim 8 wherein the protonated amphoteric surfactant has an alkyl chain length of from about 12 carbon atoms to about 24 carbon atoms.

13. The fluid of claim 8 wherein the smectite clay comprises montmorillonite and the protonated amphoteric surfactant comprises an amine oxide.

14. The fluid of claim 8 wherein the fluid further comprises a solid additive suspended in the oil, the solid additive selected from the group consisting of a polymer, a reactive metal, and combinations thereof.

15. A fluid comprising:
    water;
    a solid reactive metal;
    an oil selected from the group consisting of a diesel oil, a paraffinic oil, an olefinic oil, a mineral oil, a vegetable oil, a long chain ester, and combinations thereof; and,
    cetyl/myristyl amine oxide modified montmorillonite;
        wherein the fluid is an invert emulsion suitable for use as a drilling fluid.

* * * * *